(12) United States Patent
Hirsch et al.

(10) Patent No.: US 8,489,522 B1
(45) Date of Patent: Jul. 16, 2013

(54) PATTERN LEARNING SYSTEM

(75) Inventors: Michael J. Hirsch, Orlando, FL (US);
John T. Geiss, Safety Harbor, FL (US)

(73) Assignee: Raytheon Company, Waltham, MA (US)

( * ) Notice: Subject to any disclaimer, the term of this patent is extended or adjusted under 35 U.S.C. 154(b) by 559 days.

(21) Appl. No.: 12/750,440

(22) Filed: Mar. 30, 2010

Related U.S. Application Data

(60) Provisional application No. 61/211,523, filed on Mar. 31, 2009.

(51) Int. Cl.
*G06F 15/18* (2006.01)
*G06F 13/00* (2006.01)
*G06E 1/02* (2006.01)

(52) U.S. Cl.
USPC .................................. 706/12; 706/25; 706/26

(58) Field of Classification Search
USPC ............................................................ 706/12
See application file for complete search history.

(56) References Cited

U.S. PATENT DOCUMENTS 6,807,583 B2 * 10/2004 Hrischuk et al. .............. 719/318

* cited by examiner

*Primary Examiner* — Jeffrey A Gaffin
*Assistant Examiner* — Nathan Brown, Jr.
(74) *Attorney, Agent, or Firm* — Cantor Colburn LLP

(57) ABSTRACT

According to one embodiment, a pattern learning system includes a pattern learning tool that receives event messages in a sequential manner from multiple sensors and forms multiple sub-sequences that each includes a trigger event message, a consequence event message, and one or more intermediary event messages. The pattern learning tool then generates multiple graphs that each represents a sub-sequence of the plurality of event messages. The pattern learning tool then combines the graphs into a combined graph according to a type of each event message, and determines a causal sequence from the combined graph according to a heaviest weighted directed path from the trigger event message to the consequence event message.

18 Claims, 7 Drawing Sheets

TRADE STUDY 34a (minP=0.8, maxQ=0.4):

| TRUTHFUL SEQUENCE SIZE | NUMBER OF NOISY EVENTS | AVERAGE RANK OF TRUTHFUL SEQUENCE | # TIMES TRUTHFUL SEQUENCE RANKED FIRST | AVERAGE RUN TIME |
|---|---|---|---|---|
| 3 | 4 | 1 | 30 | 0.023935 |
| 3 | 5 | 1 | 30 | 0.022028 |
| 3 | 6 | 1.0333 | 29 | 0.022743 |
| 3 | 7 | 1 | 30 | 0.021678 |
| 3 | 8 | 1 | 30 | 0.023358 |
| 3 | 9 | 1 | 30 | 0.023094 |
| 3 | 10 | 1 | 30 | 0.023336 |
| 4 | 5 | 1.1333 | 29 | 0.035025 |
| 4 | 6 | 1 | 30 | 0.035625 |
| 4 | 7 | 1 | 30 | 0.036043 |
| 4 | 8 | 1.0333 | 29 | 0.036219 |
| 4 | 9 | 1 | 30 | 0.035859 |
| 4 | 10 | 1.0333 | 29 | 0.034606 |
| 5 | 6 | 1.1333 | 27 | 0.061037 |
| 5 | 7 | 1.0333 | 29 | 0.064243 |
| 5 | 8 | 1.0333 | 29 | 0.062547 |
| 5 | 9 | 1.0333 | 29 | 0.057485 |
| 5 | 10 | 1.0333 | 29 | 0.075801 |

34b (minP=0.8, maxQ=0.8):

| TRUTHFUL SEQUENCE SIZE | NUMBER OF NOISY EVENTS | AVERAGE RANK OF TRUTHFUL SEQUENCE | # TIMES TRUTHFUL SEQUENCE RANKED FIRST | AVERAGE RUN TIME |
|---|---|---|---|---|
| 3 | 4 | 1.2667 | 29 | 0.027431 |
| 3 | 5 | 1.2 | 29 | 0.024689 |
| 3 | 6 | 1.3 | 29 | 0.031464 |
| 3 | 7 | 1.2333 | 29 | 0.02644 |
| 3 | 8 | 1 | 30 | 0.026595 |
| 3 | 9 | 1.0333 | 29 | 0.026271 |
| 3 | 10 | 1.0333 | 29 | 0.030853 |
| 4 | 5 | 1.2667 | 29 | 0.052093 |
| 4 | 6 | 1.3667 | 29 | 0.099239 |
| 4 | 7 | 1.2667 | 29 | 0.059205 |
| 4 | 8 | 1.2667 | 29 | 0.060272 |
| 4 | 9 | 1.2333 | 29 | 0.052215 |
| 4 | 10 | 1.2333 | 29 | 0.055055 |
| 5 | 6 | 1.5667 | 27 | 0.28979 |
| 5 | 7 | 1.4333 | 28 | 0.31246 |
| 5 | 8 | 1.3667 | 28 | 0.19369 |
| 5 | 9 | 1.4 | 28 | 0.20601 |
| 5 | 10 | 1.3 | 29 | 0.17067 |

FIG. 6A

TRADE STUDY 34c (minP=0.95, maxQ=0.4)

| TRUTHFUL SEQUENCE SIZE | NUMBER OF NOISY EVENTS | AVERAGE RANK OF TRUTHFUL SEQUENCE | # TIMES TRUTHFUL SEQUENCE RANKED FIRST | AVERAGE RUN TIME |
|---|---|---|---|---|
| 3 | 4 | 1 | 30 | 0.021909 |
| 3 | 5 | 1 | 30 | 0.022543 |
| 3 | 6 | 1.0333 | 29 | 0.022941 |
| 3 | 7 | 1 | 30 | 0.022544 |
| 3 | 8 | 1 | 30 | 0.02383 |
| 3 | 9 | 1 | 30 | 0.023615 |
| 3 | 10 | 1 | 30 | 0.023786 |
| 4 | 5 | 1.1 | 29 | 0.037206 |
| 4 | 6 | 1 | 30 | 0.037674 |
| 4 | 7 | 1.0333 | 29 | 0.038281 |
| 4 | 8 | 1.0333 | 29 | 0.038644 |
| 4 | 9 | 1.0333 | 29 | 0.038068 |
| 4 | 10 | 1 | 30 | 0.036365 |
| 5 | 6 | 1.0667 | 29 | 0.066116 |
| 5 | 7 | 1.0667 | 29 | 0.07671 |
| 5 | 8 | 1 | 30 | 0.067614 |
| 5 | 9 | 1 | 30 | 0.063337 |
| 5 | 10 | 1.0333 | 29 | 0.093807 |

34d (minP=0.95, maxQ=0.8)

| TRUTHFUL SEQUENCE SIZE | NUMBER OF NOISY EVENTS | AVERAGE RANK OF TRUTHFUL SEQUENCE | # TIMES TRUTHFUL SEQUENCE RANKED FIRST | AVERAGE RUN TIME |
|---|---|---|---|---|
| 3 | 4 | 1.2667 | 29 | 0.028184 |
| 3 | 5 | 1.2 | 29 | 0.025878 |
| 3 | 6 | 1.3 | 29 | 0.032223 |
| 3 | 7 | 1.2333 | 29 | 0.026641 |
| 3 | 8 | 1 | 30 | 0.027377 |
| 3 | 9 | 1 | 30 | 0.026513 |
| 3 | 10 | 1.0333 | 29 | 0.032785 |
| 4 | 5 | 1.3 | 29 | 0.061406 |
| 4 | 6 | 1.3667 | 29 | 0.10409 |
| 4 | 7 | 1.2667 | 29 | 0.06239 |
| 4 | 8 | 1.2667 | 29 | 0.063351 |
| 4 | 9 | 1.2333 | 29 | 0.055535 |
| 4 | 10 | 1.2333 | 29 | 0.058854 |
| 5 | 6 | 1.3667 | 29 | 0.29776 |
| 5 | 7 | 1.4 | 29 | 0.38146 |
| 5 | 8 | 1.3333 | 29 | 0.2018 |
| 5 | 9 | 1.3667 | 29 | 0.2257 |
| 5 | 10 | 1.3333 | 29 | 0.21811 |

*FIG. 6B*

PATTERN LEARNING SYSTEM

RELATED APPLICATIONS

This application claims priority to U.S. Provisional Patent Application Ser. No. 61/211,523, entitled "PATTERN LEARNING SYSTEM," which was filed on Mar. 31, 2009. U.S. Provisional Patent Application Ser. No. 61/211,523 is hereby incorporated by reference.

TECHNICAL FIELD OF THE DISCLOSURE

This disclosure generally relates to information gathering systems, and more particularly, to a pattern learning system that determines causal event messages from a sequential event message stream.

BACKGROUND OF THE DISCLOSURE

Intelligence, surveillance, and reconnaissance (ISR) activities refer to a generally broad classification of activities that may be performed for information gathering purposes. Various types of sensors have been developed for providing information that are used in intelligence, surveillance, and reconnaissance activities. These sensors may be any suitable device for gathering information, such as cameras, data receivers, forward looking infrared radar systems (FLIRS), tactical remote sensor systems (TRSS), and the like. Information provided by sensors may include one or more events that occur at a particular period of time. Using information provided by these sensors, personnel may be able to determine activities of others, such as, for example, enemy movement or activity within a given military war zone, or criminal activity in an urban area.

SUMMARY OF THE DISCLOSURE

According to one embodiment, a pattern learning system includes a pattern learning tool that receives event messages in a sequential manner from multiple sensors and forms multiple sub-sequences that each includes a trigger event message, a consequence event message, and one or more intermediary event messages. The pattern learning tool then generates multiple graphs that each represents a sub-sequence of the plurality of event messages. The pattern learning tool then combines the graphs into a combined graph according to a type of each event message, and determines a causal sequence from the combined graph according to a heaviest weighted directed path from the trigger event message to the consequence event message.

Some embodiments of the disclosure may provide numerous technical advantages. For example, one embodiment of the pattern learning system may determine causal events in real time from numerous sensors that produce relatively large rates of event messages. Distributed computing systems typically provide access to large numbers of sensors that may provide useful information over relatively large informational or geographical regions. These sensors, however, may produce information at rates that may be too great to process in real time. The pattern learning tool processes event messages from sensors in a manner that determines which event messages are causal to one another in the received event message stream. Thus, the pattern learning tool may effectively filter extraneous event messages from the message stream to reveal causal event messages that may provide useful information.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which:

FIG. 6 show several tables depicting results of a trade study that was performed using the pattern learning tool of FIG. 1.

DETAILED DESCRIPTION OF EXAMPLE EMBODIMENTS

It should be understood at the outset that, although example implementations of embodiments are illustrated below, various embodiments may be implemented using any number of techniques, whether currently known or not. The present disclosure should in no way be limited to the example implementations, drawings, and techniques illustrated below. Additionally, the drawings are not necessarily drawn to scale.

As described previously, many differing types of sensors have been implemented for gathering information that may be useful in intelligence, surveillance, and reconnaissance (ISR) activities. Information gathering systems configured on distributed computing systems may be configured with numerous sensors from which useful information may be obtained. In many cases, however, events detected by numerous sensors may be received at too high a rate to determine any causal patterns that may exist among the detected events. Worse, the large volume of events detected by these sensors may have no causal relationship to one another such that beneficial event information may be relatively difficult to find.

Figure 1:
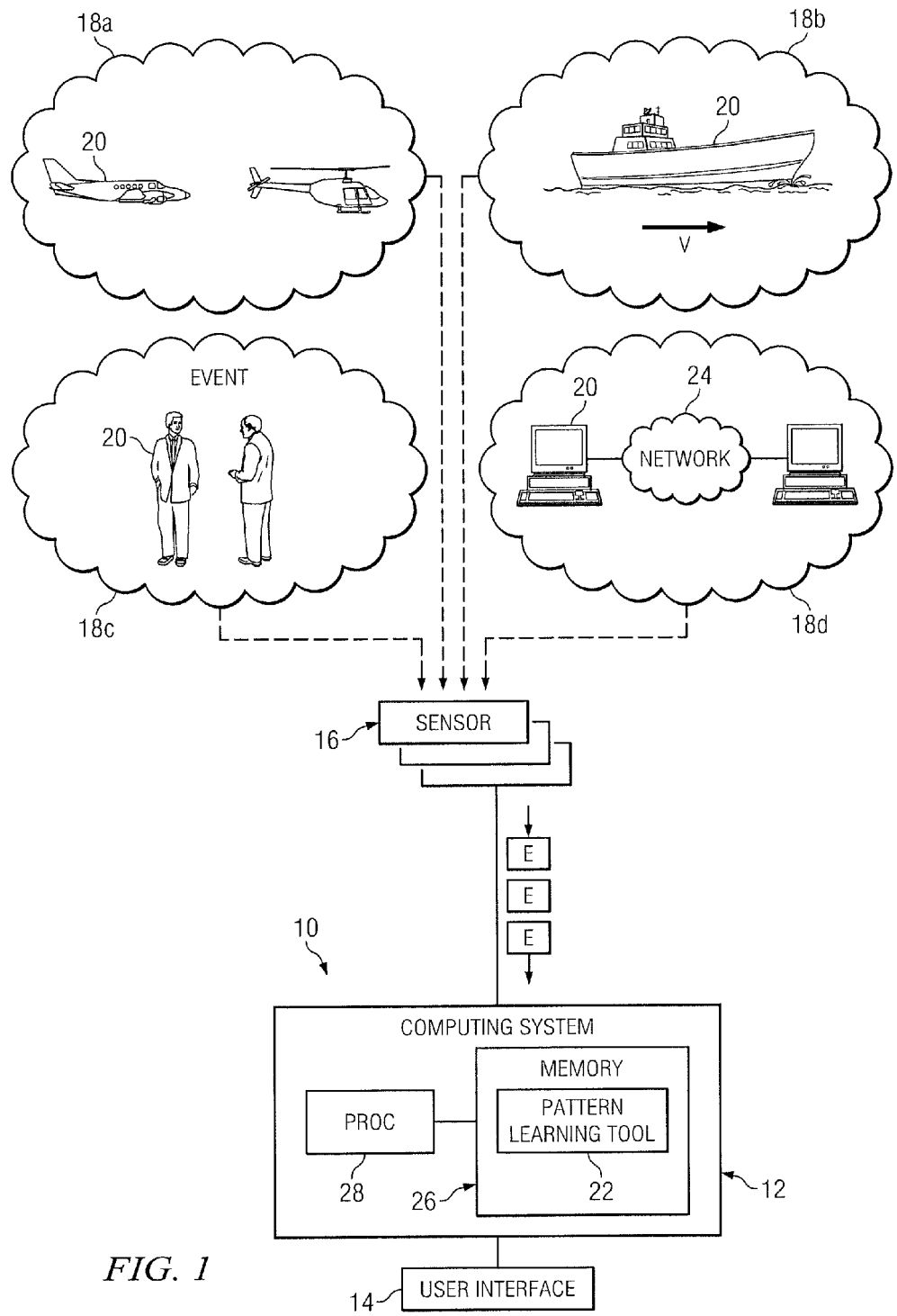
FIG. 1 shows one embodiment of a pattern learning system according to the teachings of the present disclosure.

FIG. 1 shows one embodiment of a pattern learning system 10 according to the teachings of the present disclosure. Pattern learning system 10 includes a computing system 12 that is coupled to a user interface and one or more sensors 16 that generate event messages, designated by "E" in FIG. 1, from detected events, such as aircraft combating one another 18a, the position and velocity of a sea-going vessel 18b, communication between individuals 18c, and/or messages transferred over a computer network 18d associated with one or more targets 20 of interest. Computing system 12 executes a pattern learning tool 22 that receives these event messages E and determines a causal sequence including events 18 that may be causal to one another.

Sensors 16 may include any type that detect events 18 with a temporal component. That is, sensors 16 detect events 18 in a manner such that they include a time or an elapsed period of time in which the event 18 occurred. Events 18 may be associated with one or more targets 20 of interest. For example, sensors 16 may include one or more radars or video cameras that detect the position and velocity of targets 20. As another example, sensors 16 may include eavesdropping devices that intercept communications to or from these targets 20. As yet another example, sensors 16 may include a packet analyzer or sniffer that detects certain communication packets that may be transmitted over a computer network 24 by a target 20.

Pattern learning tool 22 includes instructions stored in a memory 26 and executed by a processor 28 of computing system 12. User interface 14 displays the determined causal sequence of events for view by a user. User interface 14 may provide input to pattern learning tool 22 to control its operation.

Figure 2:
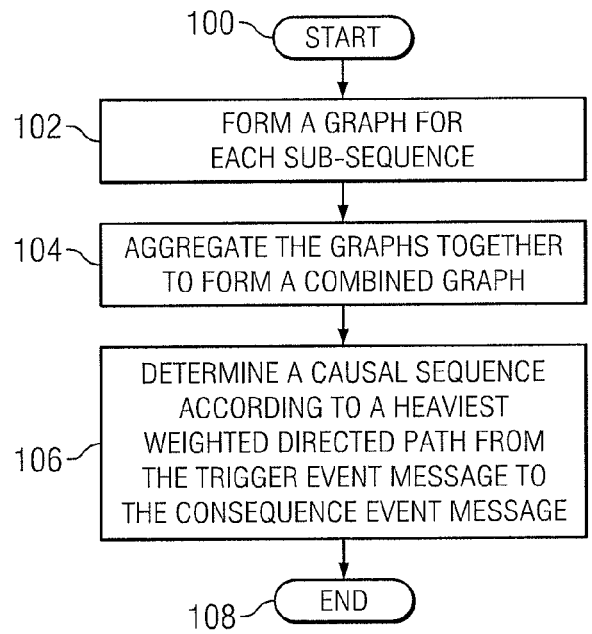
FIG. 2 is a flowchart showing one embodiment of a series of actions that may be performed by the pattern learning tool of FIG. 1 to determine a causal sequence from among multiple event messages.

FIG. 2 is a flowchart showing one embodiment of a series of actions that may be performed by pattern learning tool 22 to determine a causal sequence from among multiple event messages E. In act 100, the process is initialized.

In act 102, pattern learning tool 22 forms multiple graphs that each represents a sub-sequence of event messages received from sensors 16. Each graph includes nodes representing event messages E, and edges representing a possible causal path between subsequent event messages. Event messages E of each sub-sequence are arranged sequentially relative to one another, and may include a trigger event message E, a consequence event message E, and one or more intermediary event messages E representing events that occur after the trigger event message E and before the consequence event message E.

A consequence event message E includes information associated with a resulting event that may be of interest. For example, a consequence event message E may include information associated with a computer network that has been compromised by a hacker, or a certain communiqué transmitted from or received by a target of interest.

A trigger event message E includes information associated with an event 20 that triggers its associated consequence message E. For the example above in which the consequence event message E includes information associated with a compromised computer network, its trigger message E may include information associated with initiation of an computer network intrusion attempt generated by a hacker.

In one embodiment, pattern learning tool 22 generates graphs from event messages E in which its consequence event message E and trigger event message E are known. In another embodiment, pattern learning tool 22 generates graphs from event messages E in which their consequence event messages E are known, but their associated trigger event messages E are not known. For example, a certain event associated with a compromised computer network may be known while not knowing the initial event that caused it to occur. In such cases, pattern learning tool 22 may generate graphs that each includes the consequence event message E and several event messages E received at a specified elapsed period of time prior to the known consequence event message E.

In another embodiment, pattern learning tool 22 may generate graphs from event messages E in which their trigger event messages E is known, but their associated consequence event messages E are not known. An example of such a scenario may include known events of communication traffic over a network indicative of a hacking attempt in which little knowledge is known about how the computer network is compromised. Thus, pattern learning tool 22 may generate graphs including the known trigger event messages E and any additional event messages E received at a specified period of time after the known trigger event messages E.

In act 104, pattern learning tool 22 aggregates the multiple graphs formed in act 102 into a single combined graph according to the type of event messages E in each sub-sequence. That is, pattern learning tool 22 correlates event messages E from differing graphs with similar or relatively similar information to form the combined graph. As an example in which pattern learning tool 22 monitors activity on a computer network, pattern learning tool 22 may form a combined graph by correlating consequence event messages E that include information that may be each associated with a denial of service condition, and correlating trigger event messages E that include information that may be each associated with a successful intrusion attempt. Pattern learning tool 22 may also correlate intermediary event messages E from differing graphs with one another that occur after associated trigger event message E, and before their associated consequence event message E.

In act 106, pattern learning tool 22 determines a causal sequence from the combined graph according to a heaviest weighted directed path from the trigger event message E to the consequence event message E. The combined graph includes edges representing a possible causal path between subsequent event messages E from each graph. Pattern learning tool 22 determines the causal sequence by selecting those possible causal paths from trigger event message E to consequence event message E having the greatest number of edges. Thus, those intermediary event messages E on the heaviest weighted directed path are determined to be causal, and those event messages E not on the heaviest weighted directed path are determined to be extraneous or noisy event messages E.

The process described above may be performed again using additional graphs formed with other sub-seqeunces 30 to enhance the accuracy of the derived results. When operation of pattern learning tool 22 is no longer needed or desired, the process ends in act 108.

Figure 3:
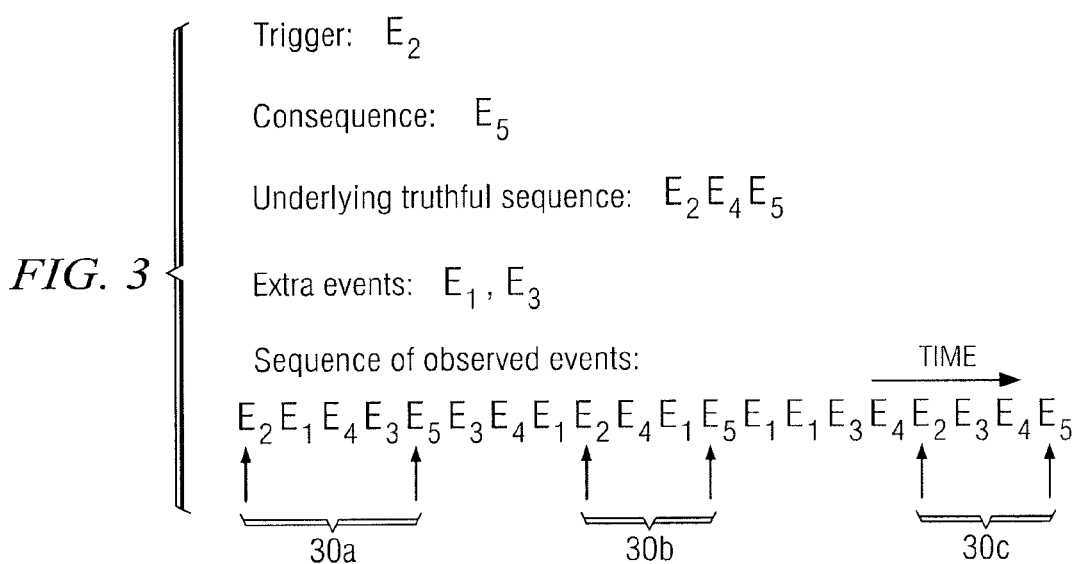
FIG. 3 shows an example sequence of event messages, that may be received and processed by the pattern learning tool of FIG. 1.

FIG. 3 shows an example sequence of event messages, E, that may be received and processed by the pattern learning tool 22 of FIG. 1. Event messages E1 through E5 are sequentially received in a manner proceeding from left to right. Each event message E1 through E5 corresponds to a particular type of event that may be detected by sensors 16. For example, event message E5 may be a consequence event message associated with a drug shipment to Miami, Fla. and event message E2 may be a trigger event message associated with the movement of money from one bank account to another. The other event messages E1, E2, and E4 may be associated with various possible causal events, such as a fast moving boat that is traveling from Northward from South America, one or more communication events between South America and the United States, and/or detected personnel movement in a suspected South American country.

The combination of each consequence event message E5 and its associated trigger event message E2 forms multiple sub-sequences 30 that may include one or more intermediary event messages E1, E3, and E4. Pattern learning tool 22 determines those event messages E that may be causal to consequence event message E5. As shown, consequence event message E5 and its associated trigger message E2 are known. In other embodiments, pattern learning tool 22 may determine causal patterns from the sequentially received events when only the consequence event message E5 is known, when only the trigger event message E2 is known, or when neither the consequence event message E5 or the trigger event message E2 is known. In the later embodiment in which at least one of the trigger event message E2 and/or the consequence event message E5 is not known, pattern learning tool 22 may arbitrarily choose a specified period of time from which to determine the existence of a causal sequence from among the received event messages E.

Figure 4A:
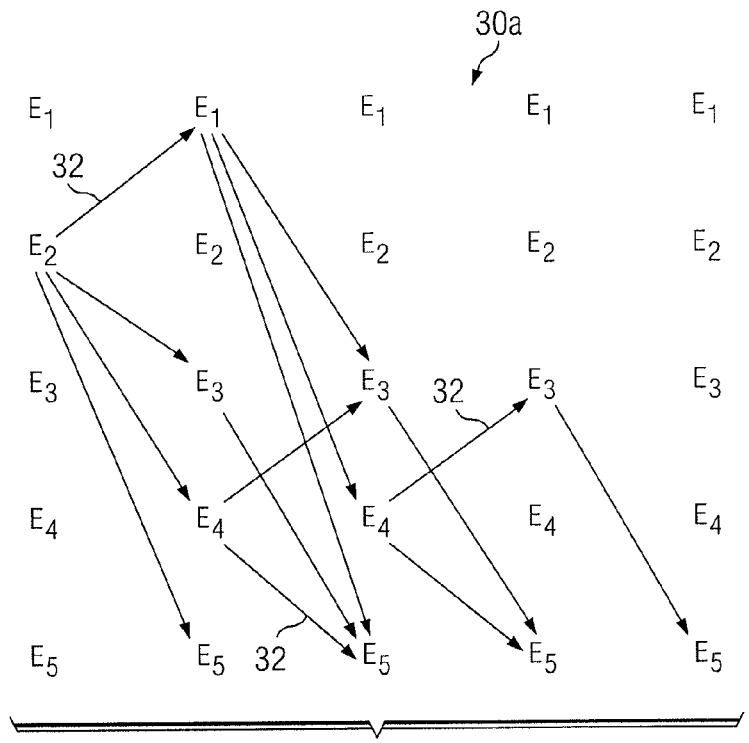
FIGS. 4A through 4C are example graphs that may be formed by the pattern learning tool of FIG. 1 from the sub-sequences of FIG. 3.
Figure 4B:
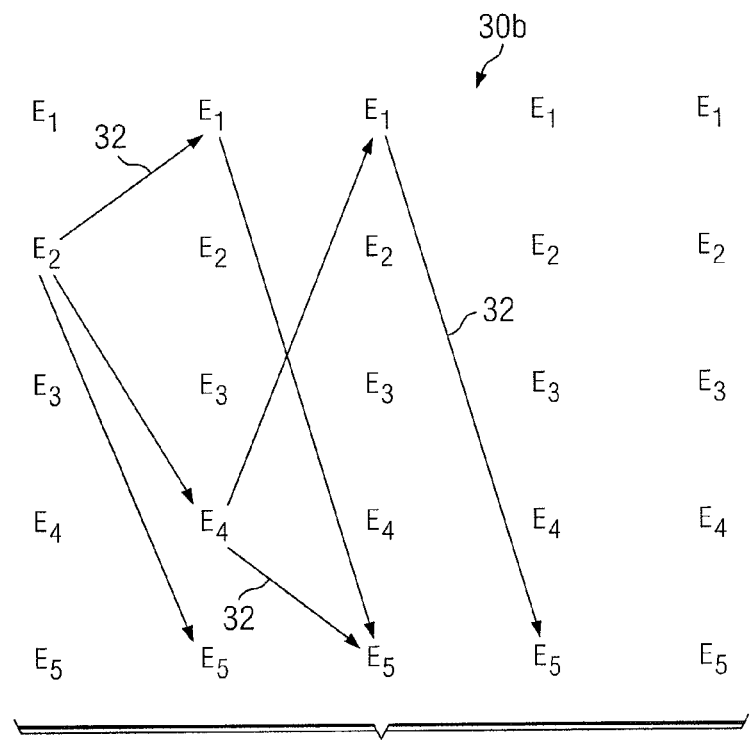
Figure 4C:
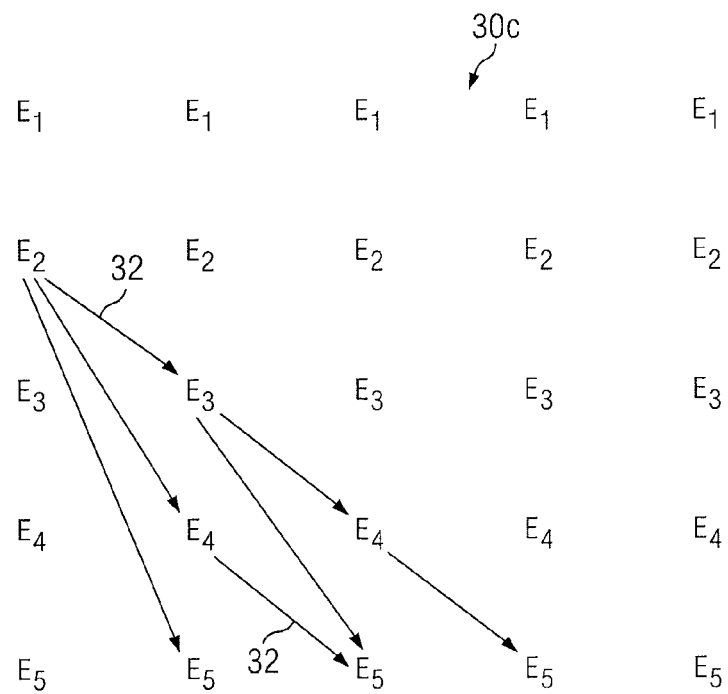

FIGS. 4A through 4C are example graphs that may be formed by the pattern learning tool 22 of FIG. 1 from the sub-sequences 30 of FIG. 3. FIG. 4A is a graph showing the possible causal paths from trigger event message E2 to consequence event message E5 of sub-sequence 30a. FIG. 4B is a graph showing the possible causal paths 32 from trigger event message E2 to consequence event message E5 of sub-sequence 30b. FIG. 4C is a graph showing the possible causal paths 32 from trigger event message E2 to consequence event message E5 of sub-sequence 30c.

Referring to FIG. 4A, pattern learning tool 22 generates possible causal paths 32 from each event message E to a subsequent event message E and for other combinations of events within sub-sequence 30a. For example, assuming that it may be possible that event message E1 is an extraneous event, possible causal paths 32 may be generated from E2 to E4, from E4 to E3, and from E3 to E5. As another example, assuming that event message E3 is an extraneous event, possible causal paths 32 may be generated from E2 to E1, from E1 to E4, and from E4 to E5. Pattern learning tool 22 performs a similar process for the other sub-sequences 30b and 30c as shown in FIGS. 4B and 4C.

Figure 5:
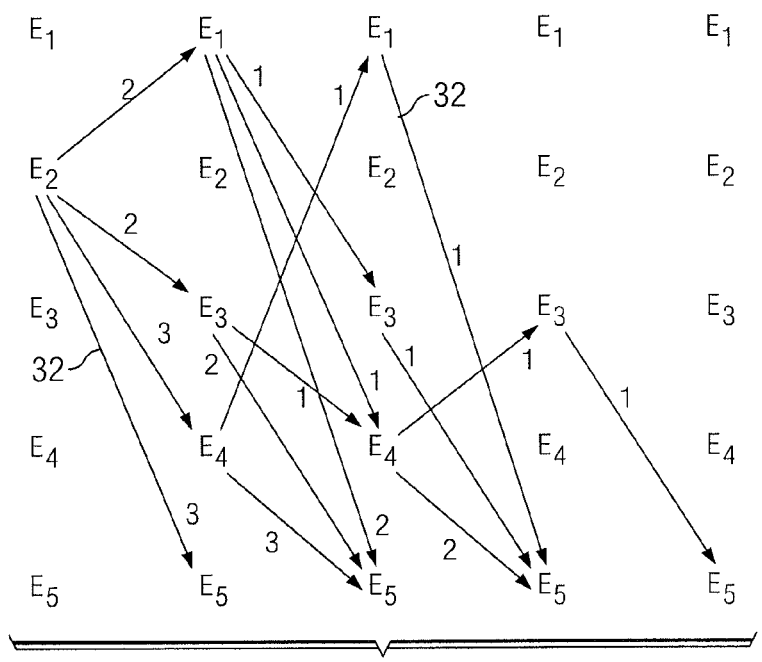
FIG. 5 is a combined graph showing the combined possible causal paths of sub-sequences of FIG. 3.

FIG. 5 is a combined graph showing the combined possible causal paths 32 of sub-sequences 30a, 30b, and 30c. Pattern learning tool 22 combines the generated possible causal paths 32 as shown in FIGS. 4A through 4C such that recurrences of possible causal paths 32 are identified with a numerical recurrence value. For example, possible causal path 32 from E2 to E4 has been generated for sub-sequence 30a, 30b, and 30c and thus has a numerical recurrence value of 3. As another example, possible causal path from E4 to E1 has only been generated for sub-sequence 30b and thus has been assigned a numerical recurrence value of 1. Pattern learning tool then determines the causal sequence, which in this case is E2 to E4 to E5, according to the numerical recurrence value between events E. In one embodiment, pattern learning tool 22 determines the causal sequence according to a minimum threshold value of the numerical recurrence value. In another embodiment, the minimum threshold value may be determined according to the sample size or quantity of sub-sequences 30.

The previously described example was conducted using a known trigger event message E2 and a known consequence event message E5. In other embodiments, pattern learning tool 22 may determine patterns when only the consequence event message E5 is known, only the trigger event message E2 is known, or when neither the trigger event message E3 or the consequence event message E4 is known. For example, it may be beneficial to determine cyber attacks that may occur from time to time on a communication network. In cases such as these, the entry point (trigger event) of the attacking entity and/or the compromised network (consequence event) may not necessarily be known. Thus, pattern learning tool 22 may form ongoing sub-sequences using specified elapsed periods of time. When and if any causal patterns are found, these causal patterns may be examined to assess the attacking entity from the determined trigger event and appropriate contingency procedures from the determined consequence event.

FIG. 6 show several tables 34a through 34d depicting results of a trade study that was performed using the pattern learning tool 22 of FIG. 1. Table 34a depicts a series of tests that were conducted in which the minimum probability that a causal sequence is determined is 0.8 and a maximum cumulative probability of observing a noise event is 0.4. Table 34b depicts a series of tests that were conducted in which the minimum probability that a causal sequence is determined is 0.8 and a maximum cumulative probability of observing a noise event is 0.8. Table 34c depicts a series of tests that were conducted in which the minimum probability that a causal sequence is determined is 0.95 and a maximum cumulative probability of observing a noise event is 0.4. Table 34d depicts a series of tests that were conducted in which the minimum probability that a causal sequence is determined is 0.95 and a maximum cumulative probability of observing a noise event is 0.8.

Rows 36 of each table represents individual tests that were performed at their respective minimum probability that a causal sequence is determined, and maximum cumulative probability of observing a noise event. Column 38a includes values representing a predetermined truthful sequence size of causal event messages E, and column 38b includes values representing a predetermined quantity of noisy event messages E.

Column 38c includes average values indicating the rank in which the truthful sequence was determined, column 38d includes values representing the number of test that were performed, and column 38e include values indicating the average time to conduct each test. As shown, the average rank values in column 38c indicate a relative success level in which pattern learning tool 22 correctly determines the truthful causal sequence. As shown, pattern learning tool 22 determined the causal sequence of each test with a relatively high degree of accuracy in a relatively short amount of time.

Figure 7:
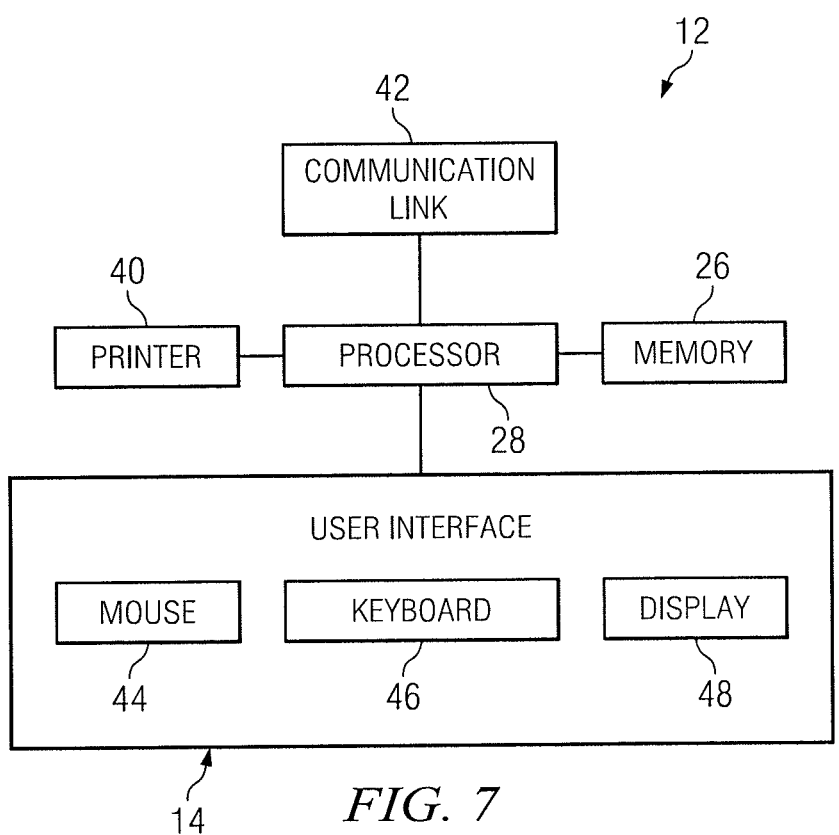
FIG. 7 presents an embodiment of an example computing system that may be used to perform one or more operations of various embodiments of the pattern learning system of FIG. 1.

FIG. 7 presents an embodiment of an example computing system 12 that may be used to perform one or more operations of various embodiments. The computing system 12 may generally be adapted to execute any of the known OS2, UNIX, Mac-OS, Linux, and Windows Operating Systems or other operating systems. The computing system 12 in this embodiment comprises a processor 28, a memory 26, a printer 40, a communication link 42, and a user interface 14 that may include a mouse 44, a keyboard 46, and a display 48. In other embodiments, the computing system 12 may include more, less, or other component parts.

Several embodiments may include logic contained within a medium. Logic may include hardware, software, and/or other logic. Logic may be encoded in one or more tangible media and may perform operations when executed by a computer. Certain logic, such as the processor 28, may manage the operation of the computing system 12. Examples of the processor 28 include one or more microprocessors, one or more applications, and/or other logic. Certain logic may include a computer program, software, computer executable instructions, and/or instructions capable being executed by the computing system 12. In particular embodiments, the operations of the embodiments may be performed by one or more computer readable media storing, embodied with, and/or encoded with a computer program and/or having a stored and/or an encoded computer program. The logic may also be embedded within any other suitable medium without departing from the scope of the invention.

The logic may be stored on a medium such as the memory 26. The memory 26 may comprise one or more tangible, computer-readable, and/or computer-executable storage medium. Examples of the memory 26 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

The communications link 42 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding.

Although the illustrated embodiment provides one embodiment of a computer that may be used with other embodiments, such other embodiments may additionally utilize computers other than computing systems as well as computing systems without conventional operating systems. Additionally, embodiments may also employ multiple computing systems 12 or other computers networked together in a computer network. For example, multiple computing systems 12 or other computers may be networked through the Internet and/or in a client server network. Embodiments may also be used with a combination of separate computer networks each linked together by a private or a public network.

Modifications, additions, or omissions may be made to pattern learning system 10 without departing from the scope of the disclosure. The components of pattern learning system 10 may be integrated or separated. For example, the instructions of pattern learning tool 22 may be executed on a single computing system or may be executed by multiple computing systems configured in a network. Moreover, the operations of pattern learning system 10 may be performed by more, fewer, or other components. For example, sensors 16 may include one or more pre-processing elements that condition event messages E prior to sending these event messages E to pattern learning tool 22. Additionally, operations of pattern learning tool 22 may be performed using any suitable logic comprising software, hardware, and/or other logic.

Although the present disclosure has been described in several embodiments, a myriad of changes, variations, alterations, transformations, and modifications may be suggested to one skilled in the art, and it is intended that the present disclosure encompass such changes, variations, alterations, transformations, and modifications as falling within the spirit and scope of the appended claims.

What is claimed is:

1. A pattern learning system comprising:
a pattern learning tool comprising memory storing instructions executable on a computing system, the pattern learning tool operable to:
    receive a plurality of sequential event messages from one or more sensors;
    generate a plurality of graphs that each represents a sub-sequence of the plurality of event messages, each graph comprising a trigger event message, a consequence event message, and one or more intermediary event messages;
    combine the plurality of graphs to form a combined graph according to a type of each event message; and
    determine a causal sequence from the combined graph according to a heaviest weighted directed path from the trigger event message to the consequence event message.

2. The pattern learning system of claim 1, wherein the trigger event message is known, the pattern learning tool operable to:
    for each sub-sequence, select the consequence event message to be a specified period of time after the trigger event message.

3. The pattern learning system of claim 1, wherein the consequence event message is known, the pattern learning tool operable to:
    for each sub-sequence, select the trigger event message to be a specified period of time before the consequence event message.

4. The pattern learning system of claim 1, wherein each of the plurality of graphs include a plurality of edges representing a possible causal path between subsequent event messages, the pattern learning tool operable to:
    combine the plurality of edges according to the type of each message associated the plurality of edges; and
    determine the causal sequence according to the heaviest weighted directed path of the combined edges from the trigger event message to the consequence event message.

5. The pattern learning system of claim 1, wherein the pattern learning tool is operable to:
    determine one or more noisy event messages from among the one or more intermediary event messages, the one or more noisy event messages comprising those intermediary event messages that do not lie along the determined causal sequence.

6. The pattern learning system of claim 5, wherein the pattern learning tool is operable to determine the one or more noisy event messages according to a specified threshold level.

7. A pattern learning method comprising:
    receiving a plurality of sequential event messages from one or more sensors;
    generating a plurality of graphs that each represents a sub-sequence of the plurality of event messages, each graph comprising a trigger event message, a consequence event message, and one or more intermediary event messages;
    combining the plurality of graphs to form a combined graph according to a type of each event message; and
    determining a causal sequence from the combined graph according to a heaviest weighted directed path from the trigger event message to the consequence event message.

8. The pattern learning method of claim 7, further comprising:
    for each sub-sequence, select the consequence event message to be a specified period of time after the trigger event message that is known.

9. The pattern learning method of claim 7, further comprising:
    for each sub-sequence, select the trigger event message to be a specified period of time before the consequence event message that is known.

10. The pattern learning method of claim 7, further comprising:
    combining the plurality of edges according to the type of each message associated a plurality of edges representing a possible causal path between subsequent event messages; and
    determining the causal sequence according to the heaviest weighted directed path of the combined edges from the trigger event message to the consequence event message.

11. The pattern learning method of claim 7, further comprising:
    determining one or more noisy event messages from among the one or more intermediary event messages, the one or more noisy event messages comprising those intermediary event messages that do not lie along the determined causal sequence.

12. The pattern learning method of claim 11, further comprising determining the one or more noisy event messages according to a specified threshold level.

13. A non-transitory, computer-readable storage medium having computer-readable instructions stored thereon that, when executed by a processor, implement a method, the method comprising:
- receiving a plurality of sequential event messages from one or more sensors;
- generating a plurality of graphs that each represents a sub-sequence of the plurality of event messages, each graph comprising a trigger event message, a consequence event message, and one or more intermediary event messages;
- combining the plurality of graphs to form a combined graph according to a type of each event message; and
- determining a causal sequence from the combined graph according to a heaviest weighted directed path from the trigger event message to the consequence event message.

14. The computer-readable storage medium of claim 13, wherein the method further comprises:
- for each sub-sequence, selecting the consequence event message to be a specified period of time after the trigger event message that is known.

15. The computer-readable storage medium of claim 13, wherein the method further comprises:
- for each sub-sequence, selecting the trigger event message to be a specified period of time before the consequence event message that is known.

16. The computer-readable storage medium of claim 13, further operable to:
- combining the plurality of edges according to the type of each message associated a plurality of edges representing a possible causal path between subsequent event messages; and
- determining the causal sequence according to the heaviest weighted directed path of the combined edges from the trigger event message to the consequence event message.

17. The computer-readable storage medium of claim 13, wherein the method further comprises:
- determining one or more noisy event messages from among the one or more intermediary event messages, the one or more noisy event messages comprising those intermediary event messages that do not lie along the determined causal sequence.

18. The computer-readable storage medium of claim 17, wherein the method further comprises determining the one or more noisy event messages according to a specified threshold level.

* * * * *